UNITED STATES PATENT OFFICE.

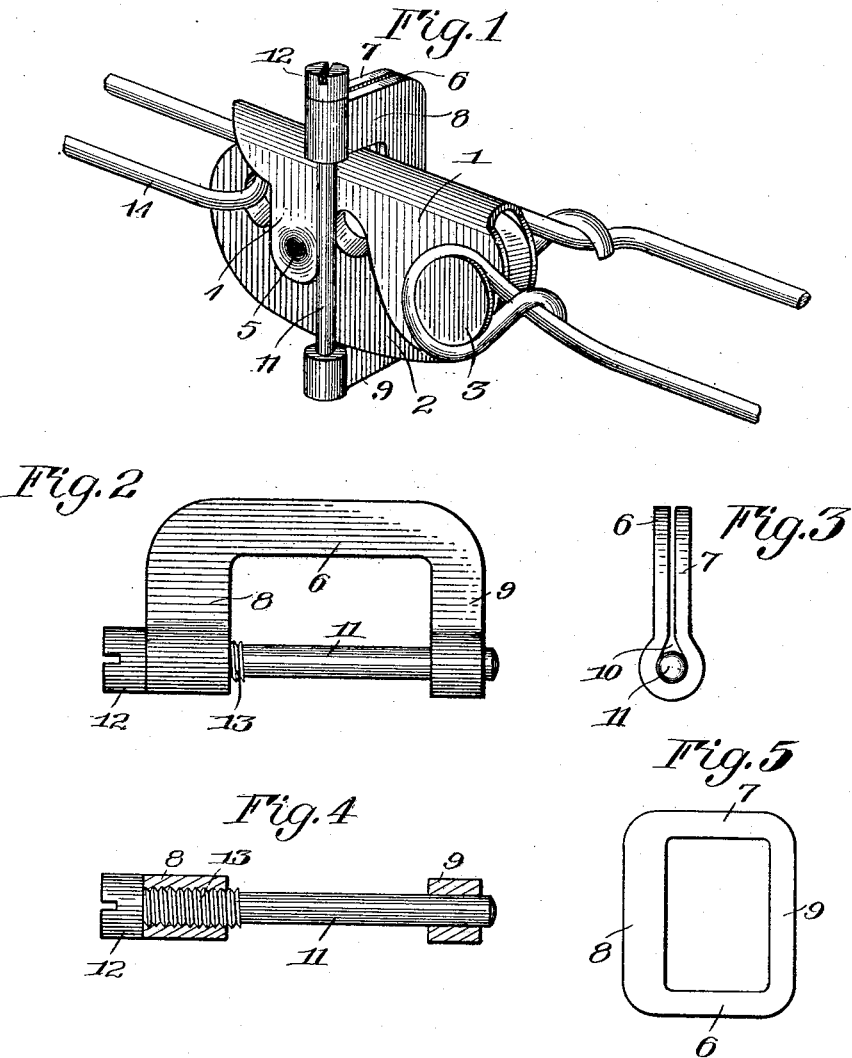

CARL A. HUBER, OF ROCHESTER, NEW YORK.

CLAMPING DEVICE FOR TIRE-CHAINS.

1,195,019.  Specification of Letters Patent.  Patented Aug. 15, 1916.

Application filed February 5, 1915. Serial No. 6,379.

*To all whom it may concern:*

Be it known that I, CARL A. HUBER, of Rochester, in the county of Monroe and State of New York, have invented certain new and useful Improvements in Clamping Devices for Tire-Chains; and I do hereby declare the following to be a full, clear, and exact description of the same, reference being had to the accompanying drawings, forming a part of this specification, and to the reference-numerals marked thereon.

The invention has for its object to provide an attachment for application to tire chains used on rubber tired and other vehicles, of the class in which the chain is coextensive with the circumference of the wheel and is fastened at its ends, and it is designed to prevent the chain fastening devices from separating or opening accidentally and thereby permitting the chain to become loose.

A further purpose of the invention is to afford a simple and inexpensive construction that can be quickly applied, and when once positioned, serves effectually to hold a chain in place.

Still another object resides in so constructing the attachment that it is securely held in proper relation to the fastening means of the chain, and is not likely to become loose or displaced.

To these and other ends the invention consists in certain improvements and combinations of parts all as will be hereinafter more fully described, the novel features being pointed out in the claims at the end of the specification.

In the drawings: Figure 1 is a perspective view showing the application of my invention in its preferred form, to a tire chain; Fig. 2 is a side elevation of the invention; Fig. 3 is an end view; Fig. 4 is a sectional view taken longitudinally of Fig. 2, and Fig. 5 is a view in elevation of the blank from which the device is formed.

Similar reference characters throughout the several figures indicate the same parts.

The invention comprises, in a general sense, a clamp that is applied to the fastening devices of a tire chain in such a manner as to engage opposite edges of the coöperating fastening members and prevent separation of the latter, as shown in Fig. 1 of the drawing.

1 and 2 designate the fastening members of the chain which are held in pivotal relation by a rivet 3 and are secured, in order to hold the chain, by means of spring arms 4 on the member 1 having projections 5 engaging coöperating recesses in the member 2. The invention comprises a yoke member shown in Fig. 2 and formed from a blank such as appears in Fig. 5, by bending the blank upon itself. The yoke member includes a base consisting of two portions 6 and 7 arranged in spaced relation to each other, as shown in Fig. 3, for a purpose that will appear presently, and arms 8 and 9 which are looped at their outer ends to form openings 10.

11 designates a pin for engaging the arms 8 and 9. The pin 11 is provided with a head 12 and a threaded portion 13 adjacent to the head and engaging a similarly threaded portion in the opening of the arm 8, while the opposite end of the pin 11 engages freely in the opening of the arm 9. The arms 8 and 9 are preferably of unequal widths, so that the arm 8 affords an extended threaded surface for retaining the pin, while the arm 9 acts as a positioning means for the end of the pin. By arranging the threaded portion 13 of the pin adjacent to the head 12, I afford means for positioning the pin more readily, since the threaded portion 13 engages the threads in the arms 8 before the opposite end of the pin engages the arm 9, and the arm 8 thus serves as a guide or centering means whereby the free end of the pin is directed into the opening of the arm 9.

In the construction of the device, the threads in the arm 8 are formed after the blank is folded, thus causing a slight spreading of the opposite portions of the blank which have a tendency to spring together when released. This action causes the opposite parts of the arm 8 to exert a clamping or gripping action on the threaded portion of the pin 11, which is thereby held tightly without the aid of a lock nut or any supplemental securing means, and with the present construction, after the pin 11 is tightly positioned, it cannot be removed except with the aid of a screw-driver.

The fastening devices 1 and 2 are located between the arms 8 and 9 of the clamp, and these prevent the fastening devices from being moved with relation to each other. Excessive longitudinal movement of the clamping device is prevented in one direction by the rivet 3 and in the other direction by the link 14 of the chain.

I claim as my invention:

1. A clamping device for tire chains including a yoke consisting of a metal blank bent upon itself to form opposite yieldable portions defining an opening, and a pin adapted to be inserted within the opening in threaded engagement with said portions whereby to spread the same and to be clamped by the action of the yieldable portions tending to assume their normal position.

2. A clamping device for tire chains including a yoke consisting of a metal blank bent upon itself and forming a base of two yieldable adjacent portions, the arms of the yoke being looped and affording openings, and a pin engageable in said openings, the pin having threaded engagement with one of the arms and adapted to spread said yieldable adjacent portions when screwed into the threaded arm.

3. A clamping device for tire chains including a yoke consisting of a metal blank bent upon itself and forming a base of two yieldable portions spaced from each other, the arms of the yoke being looped and affording openings, a pin having a head thereon and a threaded portion adjacent to the head, the pin being engageable in said openings, and its threaded portion having threaded engagement with the corresponding arm of the yoke and adapted to spread said yieldable portions when screwed into the threaded arm.

CARL A. HUBER.

Witnesses:
H. E. STONEBRAKER,
RUSSELL B. GRIFFITH.

Copies of this patent may be obtained for five cents each, by addressing the "Commissioner of Patents, Washington, D. C."